F. RAY.
EXPANSION JOINT.
APPLICATION FILED NOV. 4, 1914.
1,213,906.  Patented Jan. 30, 1917.
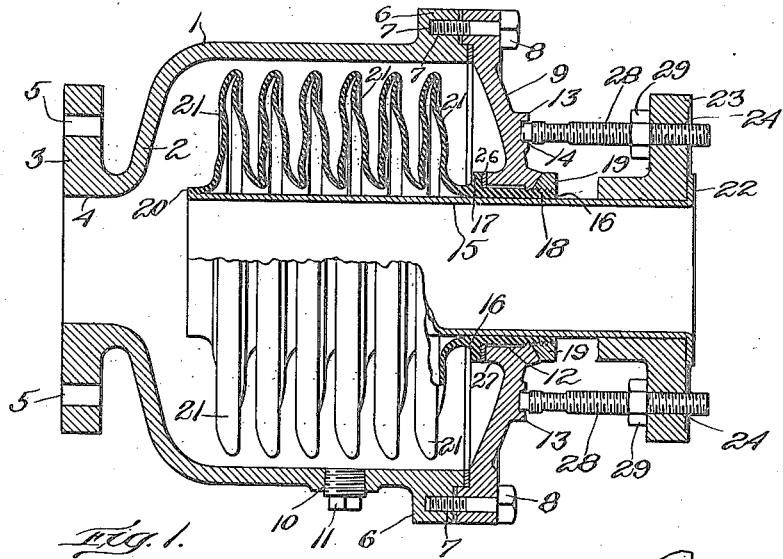
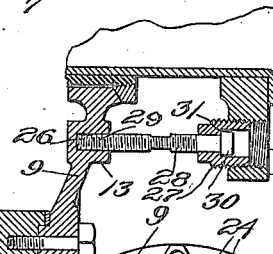
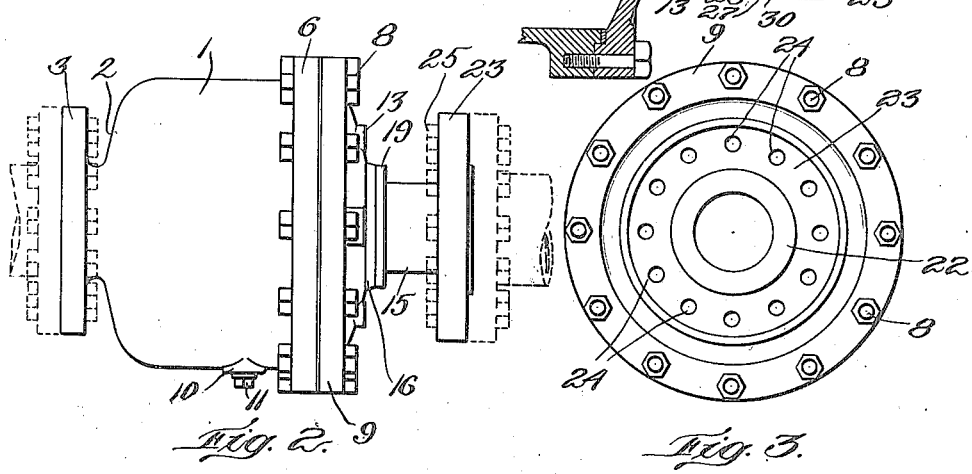
Witnesses:
James R. Hodder
R. J. Hersey
Inventor:
Frederick Ray,
by Geo. W. Maxwell
Atty.

UNITED STATES PATENT OFFICE.

FREDERICK RAY, OF SHORT HILLS, NEW JERSEY.

EXPANSION-JOINT.

1,213,906.     Specification of Letters Patent.     Patented Jan. 30, 1917.

Application filed November 4, 1914. Serial No. 870,217.

*To all whom it may concern:*

Be it known that I, FREDERICK RAY, a citizen of the United States, and resident of Short Hills, county of Essex, State of New Jersey, have invented an Improvement in Expansion-Joints, of which the following description, in connection with the accompanying drawings, is a specification, like letters on the drawings representing like parts.

My present invention of an expansion joint is particularly intended for pipes which are subject to expansion and contraction, being applicable to steam pipes (whether high or low pressure of steam), pipes for transmitting cold, etc. Taking the steam pipes as the best example of the need of my invention, it is well understood that provision must often be made in steam piping systems for the lineal expansion and contraction of the piping, due to variations in temperature in the fluid occupying the pipes. The provision for such variation in length is one of the most important and difficult problems in this line of engineering.

Heretofore it has been necessary to provide long radius bends of pipe, a steam tight packing, double swing sections on threaded fittings, or short lengths of corrugated soft metal capable of slight expansion and contraction due to their ductility. These prior methods however have been unsatisfactory as the bends and the threaded fittings required room and the corrugated sections and steam packing were limited in their extent of use, requiring frequent renewal. Furthermore all these prior methods soon resulted in more or less leaky joints and required constant attention. The short corrugated sections, especially, could only withstand a relatively few expansive and contractile movements when the metal would become crystallized and the joint would be apt to burst and be a source of danger. For short lengths of pipe between fixed joints or anchored sections, only the sliding steam tight packing or the short corrugated sections could be used.

My present invention aims to obviate all these difficulties and to provide a steam tight joint, capable of use between the anchored sections, where only a limited room is available or otherwise, and which will provide a great range of contraction or expansion and for an indefinite number of such movements, without danger of leakage and without any liability of explosion. I accomplish this in my present invention by providing a flexible member in which I take advantage of the elasticity of an elastic metal in such a way as not to exceed the elastic limit of this metal in any working position of the joint, so that the total movement of the joint shall not exceed the permissible elastic movement of its parts, thus eliminating fatigue of the metal and consequent crystallization and breakage.

Another important feature of the more complete embodiment of my present expansion joint in the preferred construction of the drawings, is that I have the entire movable portion of the joint inclosed and protected, and also so arranged as to permit the steam pressure to exert an inward force on the flexible part of the mechanism instead of an expansive or explosive force as in the prior devices, while the flexible member is so connected that its inner side communicates with the outside atmosphere through a very small opening, as nearly *nil* as possible, between a sliding tube and a fixed sleeve which would therefore permit but a comparatively slight leakage even if the flexible member should break under excess of pressure, flaws, or other causes and which acts to axially guide the movement of one pipe connection relatively to the other. Also in fitting my improved joint to piping I have provided means to adjust or regulate the extension of the flexible member of the joint so that its position shall correspond to the corresponding expansion or contraction, as the case may be, of the pipe to which the joint is to be connected, at the time of installation of the joint. This feature is of particular importance in practice, as it permits an equal movement of the elastic member each side of its normal non-stressed position, movement to one side giving tensile stress, and movement to the other side giving a compressive stress, but each within the elastic limit of the metal, thus doubling the total movement or possible limit without this feature. Also in fitting my improved expansion joint to piping I am enabled so to adjust the same that, when steam for instance is turned on and the pipe sections are in their normal heated and therefore expanded position, the flexible part of the joint is in its non-stressed position, *i. e.* without elastic strain, and is capable of a further movement, either expansive or contractile. This feature is of particular importance in practice, as it insures a long and indefinite life to the joint. In my present expansion joint construction I am enabled to use disks of steel or other material of a high flexibility and of great strength.

An expansion element constructed with disks riveted together or joined by crimping or by the ordinary processes of soldering is not as efficient as the construction I have shown, such junctions being non-homogeneous and having characteristics different from those of the plates themselves. The ultimate strength, the elastic limit, the coefficient of elasticity, the ultimate and elastic resilience will differ respectively from the corresponding properties of the disks themselves and in general will be much less. In fact, in the best embodiment of my invention, it is necessary that the disks be joined at their outer and inner peripheries in some manner such that the resulting junctions and disks will be homogeneous in respect to the physical properties just mentioned. Otherwise there results an uneven distribution of the flexure throughout the expansion element so that an excessive amount of bending will take place in the joint itself instead of uniformly throughout the metal of the annuluses. Joining the disks together by a welding gives the desired homogeneous junctions, and by making these junctions, as illustrated by means of a weld so situated that each plate is joined to the next in a continuous curved section of approximately uniform thickness the homogeneous properties of these junctions and the plates are utilized to the best advantage. It is desirable for the long life of the joint that the thickness of the metal at the junctions of the disks be not less than that of the disks.

Other features of the invention and details of construction will be hereinafter more fully pointed out in connection with the accompanying drawings in which I have shown a preferred embodiment of the invention and will be made more fully apparent in connection with the claims.

Referring to the drawings, Figure 1 is a cross sectional view, and partly broken away, of my improved expansion joint and accessories; Fig. 2 is a view on a smaller scale of the exterior of the joint indicated as interposed between lengths of pipe; Fig. 3 is an end elevation, viewing Fig. 2 from the right; and Fig. 4 is a fragmentary sectional view similar to Fig. 1 illustrating one form of change in the mechanism desirable when mounting the joint on cooling pipes, as distinguished from heating pipes.

As already implied, my invention is broadly novel in many respects, and accordingly, it will be understood that the embodiment herein shown for purposes of description and illustration is merely a preferred construction and that the invention is capable of a wide range of mechanical embodiments within the spirit and scope of the invention. But for the purpose of making the invention clearly understood, I will describe it especially with reference to a construction which is well adapted to steam pipes. Accordingly, referring to the drawings, it will be seen that I have provided a casing 1, preferably made of cast iron or steel casting shaped to receive the working part of the joint, this casing having an inturned or neck portion 2 partially inclosing the adjacent end of the continued part of the joint, said neck portion terminating in a flange 3 and opening 4 and bolt holes 5 for connection to an adjacent section of piping. At its opposite end the casing 1 has a flange 6 tapped at 7 to receive the bolts 8 of a cap or head 9 which completes the outer portion or inclosing casing of the joint when an inclosure for the latter is employed, as it is in the preferred construction or more complete embodiment of the invention. A drain or outlet 10 and closing plug 11 are provided for drawing off the condensed steam when desired. The cap or head 9 is centrally apertured at 12 to receive the adjacent portions of the joint and has a plurality of bosses 13 shown as four on its outer face provided with sockets 14 for a purpose to be described.

I come now to the more important features of the invention (I say more important because it may be used without the outer inclosure within the scope of certain of the claims). The opposite ends of the extendible-contractile section or joint proper are herein shown as consisting of a tube or pipe 15 and a collar 16 in which the tube has a sliding fit, said collar preferably having a peripheral flange 17 to receive the head 9 and a threaded end 18 to receive a locking or clamping nut 19. At its inner end 20 one end of the bellows-like elastic joint is welded, this joint being made up of a series of disks or sheet-annuluses 21 of metal which are welded to each other at their respective inner and outer edges alternately like a bellows said inner and outer edges meeting in continuous curves, as shown in Fig. 1. Each annulus is preferably corrugated circumferentially so as thereby to give further elasticity, better movement, and also to facilitate their nesting properly when moved together as closely as possible. The outer end of the series of disks or the outer end of the bellows is welded to the collar 16. This metal bellows is made of steel or other suitable sheet metal having considerable elasticity or resiliency. The outer end of the tube 15 is turned outwardly at 22 to receive a flange 23, which may be immovably secured thereon if desired, said flange having bolt holes 24 for bolts 25 by which it is united to the adjacent end of the steam pipe as shown in Fig. 2. In assembling the joint, a gasket 26 is applied between the flange 17 of the collar and a corresponding bearing or internal flange 27 on the cap 9. Viewing Fig. 1 it will be seen that the bellows is capable of being contracted by a shortening or compressing movement to the right and is capable of being extended by an expansive movement to the left, said figure showing the bellows in an intermediate position between its two extremes of shortened movement and lengthened movement, respectively. This intermediate position is the normal position of the bellows without strain or stress. The disks or annuluses are put together in this normal position in order that the joint may thereby have an increased capacity in use. By this construction it will be seen that the same expansive or contractile movement may take place on each side of this intermediate or normal position, and I take advantage of this fact to double the range of movement of the joint within the elastic capacity of the metal. If, for example, the joint is to be used on steam pipes, it will be seen that by first contracting the bellows to its extreme nested position and then mounting it in the steam piping system in this contracted condition, the initial expansion of the steam piping will first be taken up by the expansion of the joint from said nested position back to its intermediate or normal semi-expanded position and then the further expansion of the steam piping is taken up by the expansion of the joint from this normal or intermediate position to its full extended position. Or in other words, the first half of the expansion of the joint simply restores the bellows to its normal position of no stress or strain and then the joint may continue to expand or extend for the same additional distance beyond the intermediate or no-strain position and yet the bellows may be put under only the same elastic strain or stress as at the start, excepting that it will be a tensile strain instead of a compressing strain. If, on the other hand, the joint is to be used in connection with a system of cooling pipes, refrigerating pipes for instance, the procedure is simply reversed. The bellows is stretched from its intermediate normal position to its extreme length before being coupled into the system. It is then, while in this stretched or extended position, mounted properly in the system of piping. Then upon the first contracting movement of the piping it will be evident that the bellows moves first back to its intermediate position of no strain and the further contracting of the piping system simply moves it from this intermediate no-strain position to its completely contracted or nested position, and the bellows in this latter position is under no more strain than at the start. In other words, this feature of my invention provides twice the expansive or contractile movement for a given elasticity of the metal that would be secured if the normal position of no strain were either the fully contracted or the fully expanded position of the bellows.

As a convenient means of causing the initial contraction of the joint when it is desired to mount it in a heat conveying system on the one hand, or of causing the initial expansion of the joint when it is desired to mount it in a cold conveying system on the other hand, I have shown in Figs. 1 and 2 means respectively for pushing the flange 23 away from the head 9 and pulling said flange toward said head.

In Fig. 1 threaded bolts 28 are fitted loosely through the bores 24 in the flange 23 at one end, and seated in the recesses 14 at the other end, nuts 29 being mounted on said bolts to engage against the adjacent face of the flange 23. Rotation of the bolts therefore turns the bolts with relation to the nuts sufficiently to move the flange 23 away from the head 9 and thereby slide the tube 15 in the collar 16 and contract the bellows. This operation is performed while the entire joint is cold, thereby compressing the bellows from its intermediate or normal position to its fully compressed or nested position. The joint is then coupled into the steam pipe system as shown in Fig. 2 when the pipes are cold, and the bolts 28 and nuts 29 are removed, leaving the joint in position to respond to an extreme rise in temperature in the steam pipes.

In Fig. 4 I have shown the boss 13 as threaded at 26' and have mounted a threaded socket 27 in the opposite aperture 24 and have provided a bolt 28 with threaded engagement at 29 with the threads 26 and having the head 30 at its opposite end to engage an internal shoulder 31 in the boss 27 so that when the bolt 28 is screwed into the socket 13 it will pull the flange 23 toward the head 9 and thereby expand the bellows. This puts the joint in the proper expanded or extended position to be coupled into pipes which are apt to contract in use. The feature of my invention last explained is of particular importance, as it minimizes the strain on the metal disks or annuluses of the bellows, while permitting a wider range of movement. As the movement starts from a position of maximum strain in the first half of the movement the bellows simply moves from this position of maximum strain to a position of no strain, and then at the second half of the movement it moves from this intermediate position of no strain to an opposite position of maximum strain.

From the foregoing explanation the operation of the expansion joint will be readily understood and it will be seen that, in addition to the main functions and advantages already explained, that the steam tight portion is at fixed bearing places, i. e. between the bearings of the flanges 17 and 27 where a gasket 26 may be fitted conveniently. The sliding fit of the tube 15 in its collar 16 need not be steam tight, but a sliding fit merely. In the preferred embodiment of the invention in which the bellows is permanently inclosed by the casing or housing 1, all possible danger from the breaking of the expansion portion of the joint is eliminated because the expansion portion is entirely protected or covered within the housing.

I prefer so to construct the parts that the housing will serve as a stop to limit an expansive and contractile movement of the bellows beyond proper limits, as for instance, the flange 23 may strike against the nut 19 as a stop in one direction and the nesting of the sheet annuluses or disks against each other will act as a stop in the opposite direction, and thus the mechanism provides positive stops as a further protection to the metallic bellows to prevent undue strain in either direction. I prefer to make these disks of chrome vanadium steel, oil tempered, which has an elastic limit of approximately 150,000 pounds per square inch, and this will withstand practically numberless lineal movements without damage, thus rendering the expansion element of the joint practically indestructible, particularly when covered and protected as above explained. As the bellows are entirely inclosed, no condensation can collect within them, but whatever condensation there is takes place on the inside of the outer casing and can be drained off through the drain connection.

As already pointed out, my invention is capable of a wide variety of mechanical embodiments and changes in arrangement, proportion and combination of parts without departing from the spirit and scope of my invention as defined in the appended claims.

Having described my invention, what I claim as new and desire to secure by Letters Patent is:

1. An expansion joint, compensating for lengthwise expansion of pipe lines comprising an expansion member consisting of annuluses of elastic metal alternately, integrally and homogeneously joined together to form a continuous joint, the construction being such that the maximum movement of the expansion member shall not exceed the elastic movement of its parts.

2. An expansion joint compensating for lengthwise expansion of pipe lines comprising an expansion member consisting of annuluses of elastic metal alternately, integrally and homogeneously joined at their inner and outer peripheries to form a continuous joint, pipe connections at each end, and stops to prevent the expansion of the expansion member beyond the limit of the elastic metal.

3. An expansion joint comprising an expansion member consisting of annuluses of elastic metal, integral joints connecting the annuluses at their inner and outer peripheries, said joints having the same elastic character as the annuluses, and pipe connections at each end, the construction being such that maximum movement of the expansion member does not exceed the elastic movement of its parts.

4. An expansion joint comprising an expansion member consisting of a plurality of nested corrugated disks, said disks being alternately welded together at their inner and outer peripheries, so as to form junctions homogeneous with respect to the physical properties of the adjacent metal, a casing inclosing said expansion member, and a pipe connection to said expansion member extending outside of said casing.

5. An expansion joint comprising a metallic expansion member consisting of a plurality of corrugated disks, said disks being alternately welded together at their inner and outer peripheries so as to form junctions homogeneous with respect to the physical properties of the adjacent metal, a casing inclosing said member, connecting means united to said expansion member extending outside of said casing and a non-steam-tight joint between said casing and connecting means.

6. An expansion joint, comprising a metallic expansion member, consisting of a plurality of sheet annuluses, corrugated and nesting together, said annuluses being alternately joined together at their inner and outer peripheries so as to form homogeneous junctions with respect to the adjacent metal, a sliding tube rigidly secured to one end of said member and the other end of said member being loosely secured to said tube to permit a relative sliding movement, and a casing inclosing the said tube and expansion member.

7. An expansion joint, comprising a steam tight casing, a tubular member adapted to slide into said casing through a non-steam-tight joint, and an expansion member, comprising a plurality of corrugated disks, said disks being alternately joined together at their inner and outer peripheries in such manner as to make said expansion member elastically homogeneous, thereby uniting the inner end of said tube with the walls of said casing in a steam tight fitting.

8. An expansion joint, comprising a steam tight casing having an open aperture therein, a tube adapted to slide through said aperture, an expansion member elastically homogeneous, united at one end to said aperture adjacent the opening and a tubular member fitting within said opening, and having its inner end united to the other end of said member, said member comprising a plurality of metallic, corrugated disks encircling said tube and united alternately at their outer and inner peripheries to constitute a yielding metallic expansion member.

9. In an expansion joint, an expansion member consisting of elastic metallic annuluses, provided with corrugations in nesting relation, said annuluses being alternately welded together at their inner and their outer peripheries, so as to form junctions homogeneous with respect to the physical properties of the adjacent metal, and a pipe flange connected to each end of said member for enabling the member to be connected into a piping system.

10. In an expansion joint, an annular expansion member, consisting of a plurality of corrugated, metallic annuluses welded together, so as to form homogeneous junctions with respect to the adjacent metal, a tube connected to one end of said member and passing lengthwise through said member and provided at its free end with means for securing it to a pipe, and means connected to the opposite end of said expansion member for securing said opposite end to a pipe.

11. In an expansion joint, the combination of an expansion member comprising a plurality of corrugated disks of elastic metal, pipe connections secured to opposite ends of said disks, means for guiding said pipe connections axially so as to prevent bending of said joint, and means to prevent the movement of said pipe connections beyond the limit of elasticity of said expansion member.

12. In an expansion joint, the combination of a casing, an expansion member, comprising a plurality of corrugated disks of elastic metal located within said casing one end of said disks being connected to one part of said casing, a pipe connected to the other end of said disks and means for guiding said pipe connection axially with respect to said casing so as to prevent bending of said joint and stops to prevent the movement of said pipe connection beyond the limit of elasticity of said expansion member.

13. In an expansion joint, an expansion member comprising a plurality of corrugated disks having inner and outer peripheries welded to form continuous curves and connections from the opposite ends thereof for coupling said joint into a piping system, said connections being constructed and arranged to extend the expansion member upon an expansion movement of the adjacent pipes of the piping system and to contract the said member upon a contractile movement of the adjacent pipes of the piping system.

14. In an expansion joint, a metallic expansion member comprising a plurality of corrugated disks having an intermediate position of no stress and an elastic movement within the elastic limit of the metal to extreme positions in opposite directions from said intermediate position, in combination with means for adjusting said expansion member toward one of its extreme positions preliminary to mounting the same in operative position in a pipe line.

15. In an expansion joint, an elastic metal expansion-member having an intermediate position of no-stress and an elastic movement to an extreme position in opposite directions from said intermediate position, and means for adjusting said expansion member to one of its extreme positions preliminary to mounting the same in operative position in a system.

16. The combination with the adjacent ends of two pipes of a piping system, of an expansion joint provided with an elastic member having an intermediate position of no-stress and elastic movement in opposite directions therefrom, said expansion joint being secured at its opposite ends to said respective pipes, so as to be under elastic stress when said system is not working and the pipes have approximately the surrounding temperature.

17. The herein described process, consisting of connecting an expansion joint to the adjacent ends of two pipes whose lineal variations under differences in temperature are to be taken care of by said joint, when said expansion joint is in a condition of elastic tension, whereby said expansion member will have to pass from said position of strain to a position of no strain in responding to the lineal variations of said members under changes in temperature.

18. The herein described process, consisting of connecting an expansion joint to the adjacent ends of two pipes whose lineal variations under differences in temperature are to be taken care of by said joint, when said expansion joint is in a condition of elastic tension, whereby said expansion member will have to pass from said position of strain through an intermediate position of no strain to an opposite position of strain in responding to the lineal variations of said members under changes in temperature.

In testimony whereof, I have signed my name to this specification, in the presence of two subscribing witnesses.

FREDERICK RAY.

Witnesses:
JAMES R. HODDER,
R. J. HERSEY.